(12) United States Patent
Thibodaux

(10) Patent No.: US 8,187,045 B2
(45) Date of Patent: May 29, 2012

(54) AIR-PROPELLED VESSEL WITH ARTICULATING MEMBER

(76) Inventor: Ronald J. Thibodaux, Centerville, LA (US)

( * ) Notice: Subject to any disclaimer, the term of this patent is extended or adjusted under 35 U.S.C. 154(b) by 927 days.

(21) Appl. No.: 11/655,719

(22) Filed: Jan. 19, 2007

(65) Prior Publication Data

US 2008/0173224 A1    Jul. 24, 2008

(51) Int. Cl.
*B63H 7/00* (2006.01)
(52) U.S. Cl. ......................................................... 440/37
(58) Field of Classification Search .................... 440/37; 212/307, 309
See application file for complete search history.

(56) References Cited

U.S. PATENT DOCUMENTS

| | | | |
|---|---|---|---|
| 3,521,387 A * | 7/1970 | Degelman | 37/310 |
| 3,575,262 A | 4/1971 | Way | |
| 3,698,163 A | 10/1972 | Kelpin | |
| 3,741,143 A | 6/1973 | McKinley et al. | |
| 3,911,849 A | 10/1975 | Hammelmann | |
| 3,971,309 A | 7/1976 | Brodie | |
| 4,141,308 A * | 2/1979 | Gainey | 210/242.1 |
| 4,187,927 A | 2/1980 | Byrne | |
| 4,606,469 A | 8/1986 | Van Deijk | |
| 4,676,339 A | 6/1987 | Rybka et al. | |
| 4,846,357 A | 7/1989 | Sholl et al. | |
| 5,522,470 A * | 6/1996 | Stiegler et al. | 180/117 |
| 5,551,527 A | 9/1996 | Luscombe | |
| 6,056,608 A * | 5/2000 | Phelan, Sr. | 440/37 |

* cited by examiner

*Primary Examiner* — Daniel Venne
(74) *Attorney, Agent, or Firm* — Ted M. Anthony

(57) ABSTRACT

A wide, flat-bottom, buoyant, amphibious hull with a powered articulating member mounted on the deck. The hull is propelled by at least one engine-driven propeller rotating above the hull. The hull has a shallow draft and distributes its weight over a large area. These features cooperatively provide a vehicle capable of installing or servicing power transmission poles, towers, or other structures located in environmentally sensitive wetlands, swamps, marshes, shallow water, or similar terrain.

6 Claims, 3 Drawing Sheets

AIR-PROPELLED VESSEL WITH ARTICULATING MEMBER

CROSS REFERENCES TO RELATED APPLICATIONS

This application claims the benefit of U.S. Provisional Patent Application No. 60/760,070, filed Jan. 19, 2006.

STATEMENTS AS TO RIGHTS TO INVENTIONS MADE UNDER FEDERALLY SPONSORED RESEARCH AND DEVELOPMENT

NONE

BACKGROUND OF INVENTION

1. Field of Invention

The present invention relates to a vessel having an articulating member. More particularly, the present invention relates to an amphibious air-propelled vessel equipped with at least one powered articulating member. More particularly still, the present invention relates to an air boat equipped with at least one powered articulating member.

2. Description of Related Art

Towers, such as radio transmission towers and/or electrical power transmission towers, are frequently located in shallow lakes or bays, or in low-lying, swampy or marshy wetland areas. Depending on the particular location or climate, such areas can often be covered with snow or ice.

Frequently, equipment situated at or near the top of such towers requires servicing or repair. For example, it is often necessary to replace aircraft warning lights, or to repair equipment near the top of such towers following hurricanes or other violent weather events. In many cases, such servicing requires that maintenance personnel be lifted to the upper extent of such towers, often by means of hydraulically operated personnel lifts, in order to access the equipment in question.

When located on firm ground, towers can be easily accessed and serviced using personnel lifts mounted on trucks or other conventional vehicles. However, towers situated in lakes or marshy environments cannot be accessed by trucks or other wheeled vehicles. Although boats can be used in some circumstances, towers situated in shallow lakes or marshy environments are often inaccessible to standard boats because the water depth is too shallow to accommodate the draft of such boat, or because plant growth inhibits or prevents the use of conventional propellers.

In many cases, towers located in shallow lakes or bays, or swampy or frozen environments, can only be accessed by tracked vehicles often referred to as "swamp buggies". Such swamp buggies are generally slow, awkward and inefficient to operate. Further, the tracks of swamp buggies often severely damage environmentally sensitive areas including, without limitation, water bottoms, oyster reefs and the like. Moreover, swamp buggies must often take circuitous routes when traveling to a work site depending upon the terrain at issue, thereby increasing overall inefficiency and damage to the environment.

Thus, there is a need for a vehicle having a articulating member that can access work sites situated in remote locations. Such vehicle should be able to easily traverse land, marine and marshy environments, including environments having relatively shallow water depths. Further, such vehicle should be agile and efficient, and should cause minimal negative effects on environmentally sensitive areas.

SUMMARY OF THE INVENTION

The present invention comprises an air-propelled vessel having a device for lifting personnel to allow such personnel to access locations elevated above ground (or water) level. In the preferred embodiment, said air-propelled vessel comprises an air boat having a hydraulically operated articulating member mounted thereto. Said air boat is generally amphibious, as it can traverse over both land and water. Said air boat is also fast and agile, thereby increasing efficiency associated with the use of such air boat. Because of its relatively light weight, as well as the distribution of such weight over a relatively large surface area of its hull, the vessel glides easily over virtually any terrain. Moreover, said vessel can traverse marshy areas without damaging water bottoms or otherwise negatively affecting environmentally sensitive elements of such areas.

Propulsion of said vessel is not hampered by plant growth, especially in shallow water. The versatility of the air boat allows the present invention to travel directly to a work site. This capability is especially important following disasters and severe weather events. For example, quick and efficient access to utility towers can be critical for restoration of electrical power and other utilities.

The present invention comprises an air boat having a wide, light-weight hull. The hull of the present invention has a substantially flat bottom. As such, the draft of the vessel is very shallow, and the weight of the hull is distributed over a relatively large area. Further, the bow of the air boat is wide, and perpendicular to the sides in a horizontal plane. In a vertical plane, said bow sweeps from the deck to the bottom of the air boat in a gentle, large arch.

As such, the square bow provides a large deck area, and the gentle sweep of the bow allows a hydrodynamic shape with minimum resistance to the forward motion of the vessel. At least one engine-driven propeller rotates in the air above the deck of the hull in a substantially vertical plane to propel the vessel forward. Stabilizers, such as spuds or outriggers, can be deployable to prevent listing of the hull.

A hydraulically operated articulating member is disposed on said hull such that the position of the center of gravity of the total weight of the vessel and associated equipment is optimized. A bucket suitable for carrying personnel and/or equipment can be disposed at one end of said articulating lift. Said bucket can be raised, lowered, and rotated. As such, the bucket can be maneuvered above and lateral to the hull making any point within a large semi-spherical volume accessible to personnel within the bucket.

It is to be observed that the present invention is described primarily in the context of a personnel bucket or other similar device affixed to an articulating member. However, any number of other beneficial attachments can be employed in connection with such articulating member. For example, but not by way of limitation, shovels, augers and the like can be beneficially used with said articulating member.

BRIEF DESCRIPTION OF DRAWINGS

FIG. 3A depicts a side view of the base of the articulating member of the present invention.

DETAILED DESCRIPTION OF A PREFERRED EMBODIMENT

Figure 1:
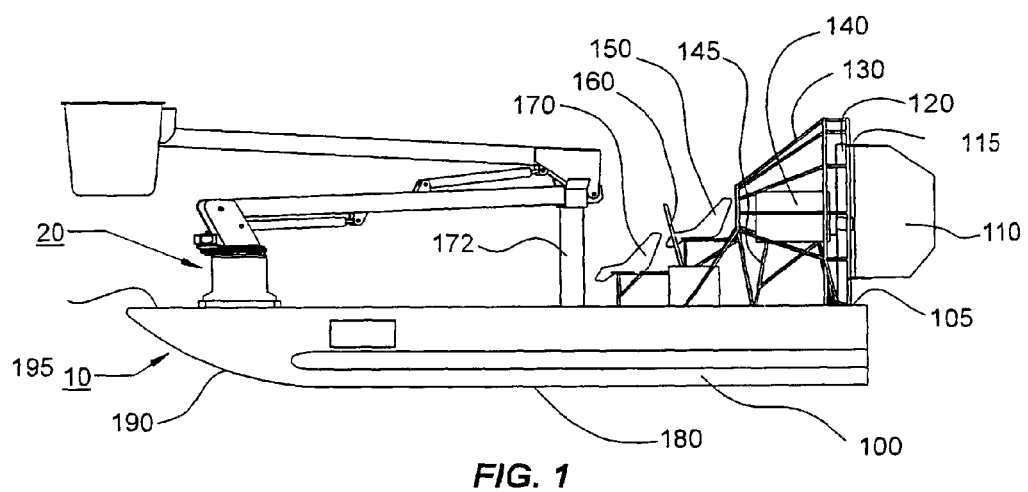
FIG. 1 depicts a side view of the present invention with an articulating member in the collapsed position.

FIG. 1 depicts a side view of vessel 1 of the present invention, including air boat 10 and hydraulically operated articulating member 20. Articulating member 20 has a collapsed position depicted in FIG. 1 and FIG. 2. When air boat 10 is underway, articulating member 20 is typically maintained in said collapsed position as depicted in FIG. 1 and FIG. 2.

Air boat 10 comprises a hull 100 having a relatively flat keel 180, an aft deck 105 and a bow deck 195. Aft deck 105 and bow deck 195 are best seen in FIG. 2. Air boat 10 is powered by at least one engine 140, which in the preferred embodiment, is mounted on aft deck 105 by engine frame 145 and rotates propeller 120. In the preferred embodiment, propeller 120 is an aircraft-type propeller. Said at least one engine 140 and propeller 120 produce forward thrust by moving air rearward in a generally similar manner that an aircraft engine and an aircraft propeller produce thrust to move an airplane. Engine 140 and propeller 120 are enclosed within propeller guard 130. Rudders 110 are thin vertical plates pivotally attached to said propeller guard 130 by vertical hinges 115. Said hinges 115 are best seen in FIG. 2. Rudders 110 are disposed within the slipstream generated by engine 140 and propeller 120, such that rotation of rudders 110 about hinges 115 diverts the orientation of said slipstream and, as such, changes the direction of thrusting forces acting on air boat 1.

Control lever 160 is disposed near driver's seat 150. Control lever 160 is attached to rudders 110. In the preferred embodiment, control lever 160 is attached to rudders 110 via a conventional linkage mechanism (not shown). Movement of control lever 160 causes rotation of rudders 110 about hinges 115 and, as such, provides a means of steering air boat 10. Optional passenger seat 170 is disposed forward of driver's seat 150. In FIG. 1, articulating member 20 is depicted in a collapsed position; in such position, articulating member 20 is supported and secured by column 172.

Figure 2:
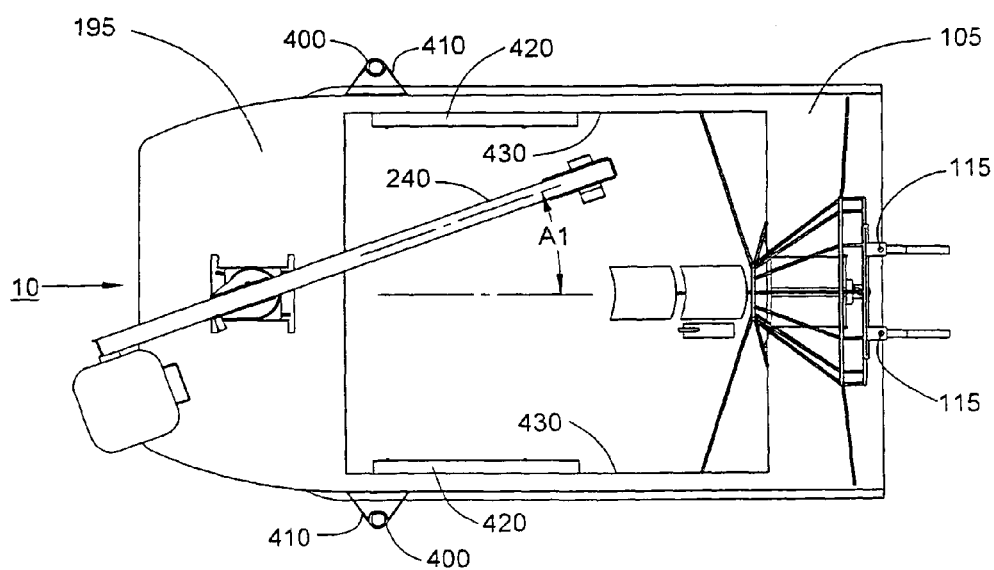
FIG. 2 depicts an overhead view of the present invention with the articulating member in the collapsed position.

FIG. 2 depicts an overhead view of air boat 10 and hydraulically operated articulating member 20. Bow deck 195, aft deck 105, and rudder hinges 115 are clearly visible in this view. Two vertical cylindrical tubes 400 are symmetrically disposed laterally about the longitudinal axis of hull 100 and attached to hull 100 by brackets 410. Air boat 10 beneficially includes two stabilizing spuds 420. Spuds 420 are relatively long cylindrical tubes having an outside diameter slightly smaller than the inside diameter of cylindrical tubes 400. As such, spuds 420 can be slidably received within cylindrical tubes 400. Spuds 420 have a stowed position and a deployed position. In stowed position, spuds 420 are secured horizontally along inside walls 430 of hull 100.

Articulating member 20 comprises first beam 240 and second beam 280. While air boat 10 is underway or in transit, articulating member 20 is rotatably disposed such that the angle designated as A1, is defined between the longitudinal axis of first beam 240 and the longitudinal axis of hull 100, thereby providing additional space for a passenger located in seat 170.

Figure 3:
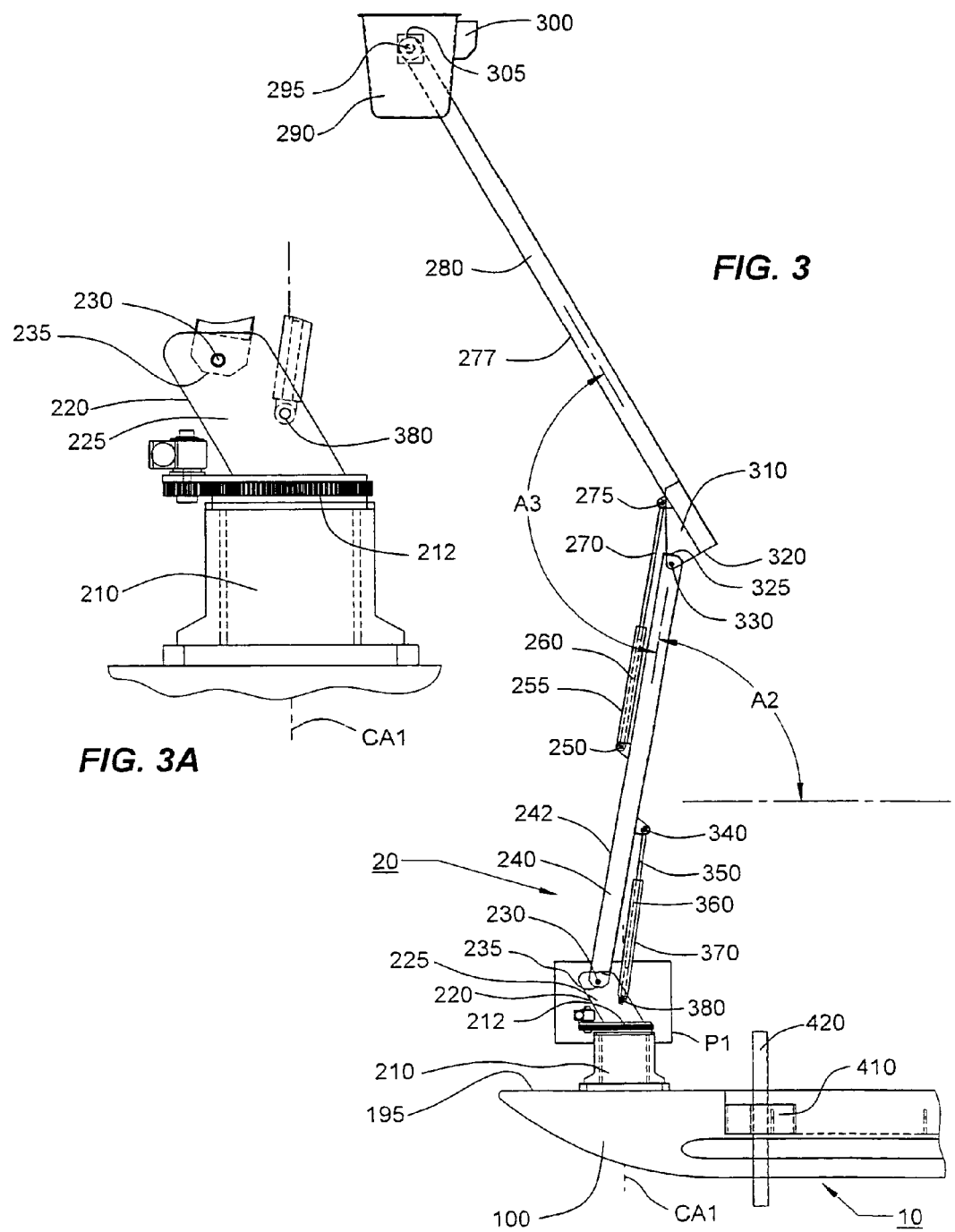
FIG. 3 depicts a partial side view of the present invention with the articulating member in an extended position.

FIG. 3 depicts a partial view of air boat 10 with articulating member 20 in an extended position. FIG. 3A depicts a portion of such structure for clarity. Articulating member 20 comprises a hydraulic assembly (not shown in FIG. 3A). In the preferred embodiment, said hydraulic assembly is a conventional hydraulic assembly comprising a combination of a reservoir tank, pump, a motor, as well as hoses and control valves. Said hydraulic assembly is of a construction well known to those having skill in the art. Said hydraulic assembly is commonly used in numerous and various applications involving hydraulic rams and therefore is not described or shown in detail.

Articulating member 20 comprises fixed base 210 which is rigidly mounted to bow deck 195 of hull 100. Fixed base 210 has a flat, horizontal, circular top surface 212. Vertical central axis denoted as CA1 is defined through the center of top surface 212 of fixed base 210. Rotating base 220 is disposed above fixed base 210 and is rotatably attached to fixed base 210 such that rotating base 220 is free to rotate about vertical central axis CA1. Rotating base 220 is restrained from rotation about horizontal axes.

Vertical plane P1 is defined to be coincident with vertical central axis CA1. Vertical plane P1 is fixed relative to rotating base 220. As such, plane P1 rotates as rotating base 220 rotates about vertical central axis CA1. Two vertical plates 225 extend upward from rotating base 220. However, only one plate 225 is visible in this view because it obscures the second plate 225 from view. Plates 225 are parallel to plane P1 and are disposed symmetrically equidistant about plane P1.

First beam 240 is disposed between plates 225 such that the longitudinal axis of first beam 240 lies on plane P1. First beam 240 is pivotally attached to plates 225 by pivot pin 230 at first end 235 of first beam 240. First beam 240 has a second end 325 and a first end 235. First ram 370 is a conventional hydraulically operated ram, such as can be found in common use. First ram 370 comprises cylinder 360 and ramrod 350. Ramrod 350 is concentric to cylinder 360 and is moved axially by hydraulic pressure supplied and controlled by a conventional hydraulic assembly of a type well known to those having skill in the art (not shown).

Cylinder 360 is pivotally attached to plates 225 by pivot pin 380. Ram rod 350 is pivotally attached to first beam 240 by pivot pin 340. Angle A2 is defined as that angle existing between the longitudinal axis of first beam 240 and a substantially horizontal plane. As such, extension of first ram 370 causes in angle A2 to increase. Conversely, retraction of first ram 370 causes angle A2 to decrease.

Articulating member 20 further comprises second beam 280 disposed such that the longitudinal axis of second beam 280 lies within plane P1. Second beam 280 comprises side plates 310 fixedly attached at first end 320 of second beam 280. Side plates 310 are pivotally attached to second end 325 of first beam 240 by pivot pin 330. Second ram 255 is disposed between first beam 240 and second beam 280. Second cylinder 260 of second ram 255 is pivotally attached to top surface 242 of first beam 240 by pivot pin 250. Second ram rod 270 of second ram 255 is pivotally attached to bottom surface 277 of second beam 280 by pivot pin 275. Angle A3 is defined as that angle existing between the longitudinal axis of first beam 240 and the longitudinal axis of second beam 280. Second beam 280 has a second end 305 opposite first end 32. Bucket 290 is disposed at second end 305 of second beam 280 and is pivotally attached to second beam 280 by hinge pin 295.

As such, extension of second ram 255 causes second beam 280 to rotate about pivot pin 330 such that angle A3 increases, and bucket 290 is raised. Conversely, retraction of second ram 255 causes second beam 280 to rotate about pivot pin 330 such that angle A3 decreases, and bucket 290 is lowered.

FIG. 3 also depicts spuds 420 in the deployed position. That is, spuds 420 are disposed within vertically oriented cylindrical tubes 400. As such, spuds 420 can be beneficially lowered to the bottom of shallow water or into mud to stabilize hull 100 during operation of articulating member 20.

Figure 4:
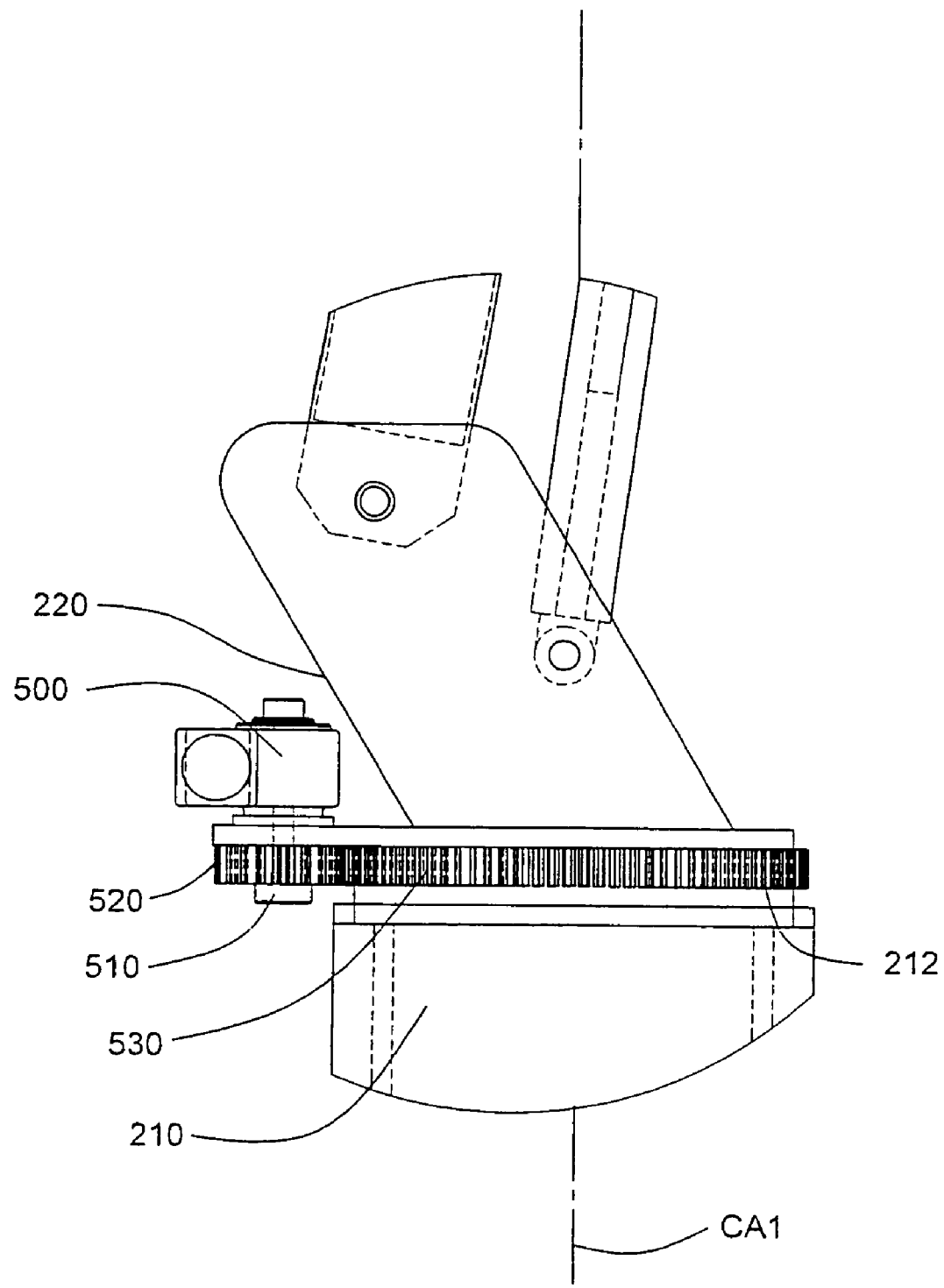
FIG. 4 depicts a detail view of the base of the articulating member of the present invention.

FIG. 4 shows a detail view of fixed base 210 and rotating base 220. Articulating member 20 comprises motor and gearbox assembly 500. Motor and gearbox assembly 500 is a standard assembly is in common use in numerous and various applications. Motor and gearbox assembly 500 comprises output shaft 510 which rotates when the motor of motor and gearbox assembly 500 is energized. Pinion 520 is fixedly attached to vertical output shaft 510 of motor and gearbox assembly 500. Ring gear 530 is fixedly attached to top surface 212 of fixed base 210 and is concentric to vertical central axis CA1. As such, ring gear 530 is restrained from rotation. Pinion 520 meshes with ring gear 530. As such, when motor and gearbox assembly 500 is energized, pinion 520 rotates about output shaft 510 causing rotating base 220 to rotate about vertical central axis CA1.

In operation, the vessel 1 of the present invention may be transported aboard a trailer or towed by a truck to the most convenient point of entry into the environment for which air boat propulsion is required. Because of the amphibious capability of the air boat of the present invention, such point of entry may be a boat-launch site into water. Alternatively, such point of entry may be solid ground, marsh, swamp, snow, ice, or virtually any other environmental surrounding. During transportation on the trailer, and while underway to the worksite, the articulating member and the stabilizing means are secured in the collapsed position and supported by the beam support as described previously.

Upon reaching the worksite, such stabilizing means can be deployed and the hydraulic man-lift can be actuated from its collapsed position to a working position. Auxiliary equipment, such as an auger or pole handling equipment may then be mounted onto the articulating member, if required. Personnel can enter the basket and maneuver the articulating member to the most convenient and safest position to accomplish the required tasks. Upon completion of the work, the articulating member can be secured in a collapsed position, the stabilizing means are retracted and secured, and the air boat can move to the next work site or return to the point of entry.

It can be seen that the air boat with hydraulic articulating member of the present invention provides an environmentally safe and efficient means of servicing remote work locations including, but not necessarily limited to, towers and other structures situated in marine environments. The present invention can be used to access such work locations in shallow water, or in lakes having dense aquatic vegetation or which are covered with ice, as well as marshes, swamps, and other environmentally sensitive or inaccessible locations. While the above description contains many specifics, these are not to be construed as limitations of the scope of the invention but rather as an exemplification of one preferred embodiment thereof. Other variations are possible. For example, the bottom of said air boat 10 may be coated with a smooth material of high lubricity to reduce friction when traveling over land or similar terrain.

Further, an auger or similar device for drilling holes in the ground for the placement of power line transmission poles may be attached to the articulating member of the present invention. A gripping attachment may also augment the utility of said articulating member for setting power line transmission poles. An alternative to the articulating beams of the articulating member described above may be a telescopic extension ladder with a bucket attached.

The above-described invention has a number of particular features which should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A vessel comprising:
    a. a wide hull having a low draft and an upper surface;
    b. at least one drive motor mounted to said hull;
    c. a propeller affixed to each of said at least one drive motor;
    d. at least one rudder positioned aft of each propeller for steering said hull;
    e. an articulating boom, pivotally attached to the upper surface of said hull, comprising:
        i. a first rigid member having a base and a distal end, wherein said base of said first rigid member rotates about vertical and horizontal axes intersecting said base; and
        ii. a second rigid member having a base and a distal end, wherein the base of said second member is pivotally attached to the distal end of said first rigid member, and said second rigid member pivots about a horizontal pivot axis between said first and second rigid members
    f. means for selectively moving said boom about said vertical and horizontal axes intersecting said base of said first rigid member; and
    g. means for selectively extending and retracting said articulating boom.

2. The vessel of claim 1, wherein said articulating boom is attached to the bow of said hull.

3. The vessel of claim 1, further comprising a basket attached to said distal end of said second rigid member of said articulating boom.

4. A vessel comprising:
    a. a wide hull having a low draft, an upper surface and a lower surface, wherein said lower surface comprises a smooth material for reducing friction;
    b. at least one drive motor mounted to said hull;
    c. a propeller affixed to each of said at least one drive motor;
    d. at least one rudder positioned aft of each propeller for steering said hull;
    e. an articulating boom, pivotally attached to the upper surface of said hull, comprising:
        i. a first rigid member having a base and a distal end, wherein said base of said first rigid member rotates about vertical and horizontal axes intersecting said base; and
        ii. a second rigid member having a base and a distal end, wherein the base of said second member is pivotally attached to the distal end of said first rigid member, and said second rigid member pivots about a horizontal pivot axis between said first and second rigid members
    f. means for selectively moving said boom about said vertical and horizontal axes intersecting said base of said first rigid member; and
    g. means for selectively extending and retracting said articulating boom.

5. The vessel of claim 4, wherein said articulating boom is attached to the bow of said hull.

6. The vessel of claim 4, further comprising a basket attached to said distal end of said second rigid member of said articulating boom.

* * * * *